Figure 1:
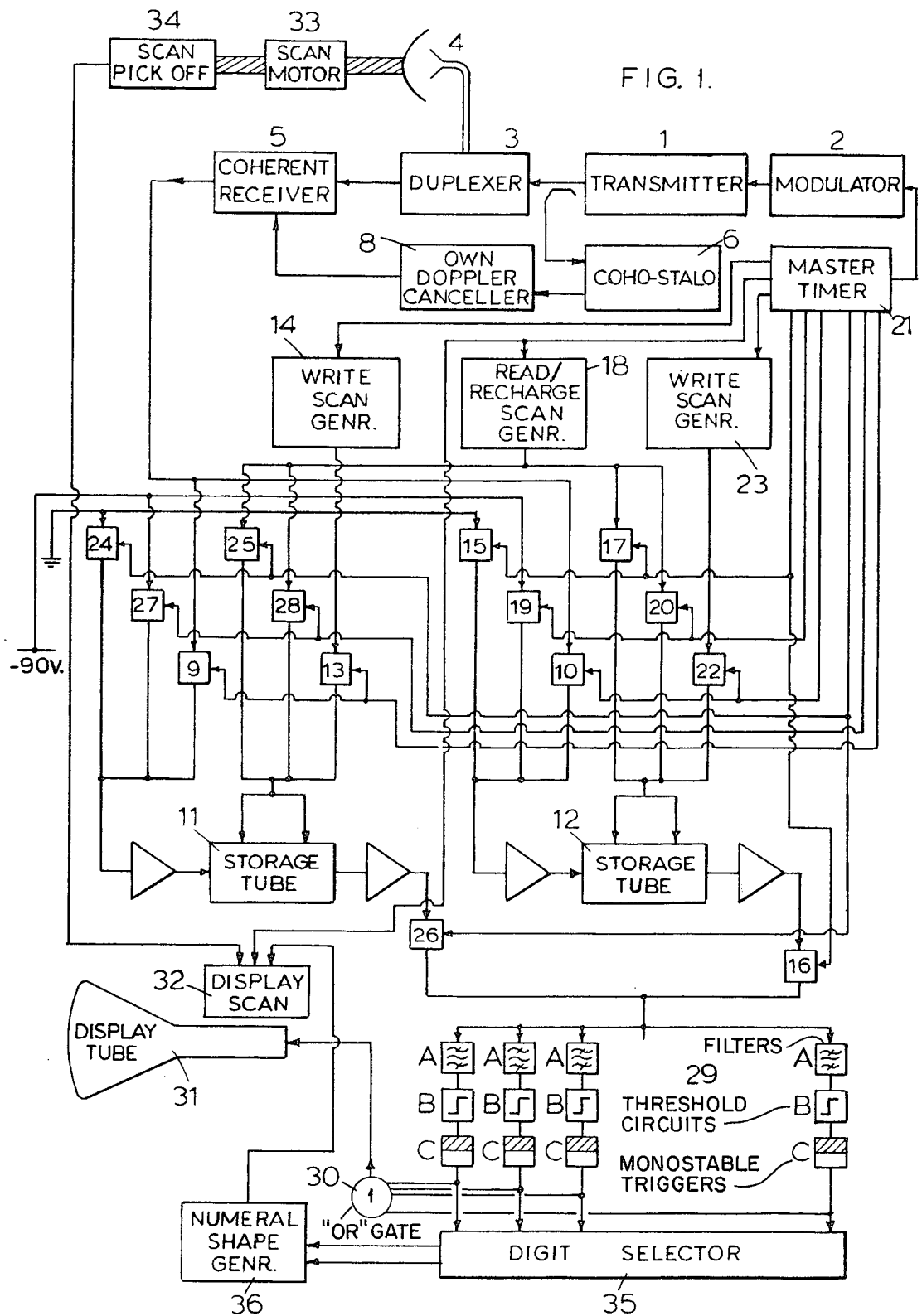

United States Patent [19]

White

[11] 3,967,284

[45] June 29, 1976

[54] RADAR APPARATUS FOR DETECTING A COHERENT DOPPLER SIGNAL IN CLUTTERED ENVIRONMENTS

[75] Inventor: Eric Lawrence Casling White, Iver, England

[73] Assignee: EMI Limited, Hayes, England

[22] Filed: Jan. 22, 1965

[21] Appl. No.: 428,286

[30] Foreign Application Priority Data

Jan. 22, 1964 United Kingdom.................. 2864/64

[52] U.S. Cl....................................... 343/9; 343/7.7
[51] Int. Cl.²......................... G01S 9/42; G01S 9/46
[58] Field of Search................ 343/7.7, 8, 9, 10, 11, 343/5 PD

[56] References Cited

UNITED STATES PATENTS 3,228,028  1/1966  Baum et al....................... 343/7.7 X Primary Examiner—Maynard R. Wilbur
Assistant Examiner—Gregory E. Montone
Attorney, Agent, or Firm—Fleit & Jacobson

EXEMPLARY CLAIM

1. Radar apparatus comprising means for generating a series of pulses of oscillation, scanning aerial means for transmitting said pulses as a beam narrow in azimuth in different directions sequentially, the repetition frequency of said pulses being sufficiently high in relation to the angular velocity of the aerial means and the angle of the beam that a plurality of successive transmitted pulses impinge on a point target, a coherent receiver for reflected energy, means for storing returns derived from said receiver in response to a plurality of successive pulses of oscillation from said transmitting means, means for selecting returns corresponding to a predetermined range stored in said storing means, and means for examining selected returns to detect a cyclic component of substantially constant periodicity indicating the presence of a target at said predetermined range having a radial velocity relative to the apparatus represented by said periodicity.

11 Claims, 3 Drawing Figures

RADAR APPARATUS FOR DETECTING A COHERENT DOPPLER SIGNAL IN CLUTTERED ENVIRONMENTS

The present invention relates to radar apparatus, and particularly to apparatus for processing radar returns.

If radar is used for searching for a target in a region which generates a lot of clutter, such as, for example, a snorkel of a submarine projecting from the surface of the sea, it is necessary to examine the radar return signals for the presence of a component exhibiting a coherent doppler shift in frequency.

It is an object of the present invention to provide means for detecting a coherent doppler shift in radar return signals.

According to the present invention there is provided radar apparatus comprising means for generating a series of pulses of oscillation, scanning aerial means for transmitting said pulses as a beam narrow in azimuth in different directions sequentially, the repetition frequency of said pulses being sufficiently high in relation to the angular velocity of the aerial means and the angle of the beam that a plurality of successive transmitted pulses impinge on a point target, a coherent receiver for reflected energy, means for storing returns derived from said receiver in response to a plurality of successive pulses of oscillation from said transmitting means, means for selecting returns corresponding to a predetermined range stored in said storing means, and means for examining selected returns to detect a cyclic component of substantially constant periodicity indicating the presence of a target at said predetermined range having a radial velocity relative to the apparatus represented by said periodicity.

Figure 2:
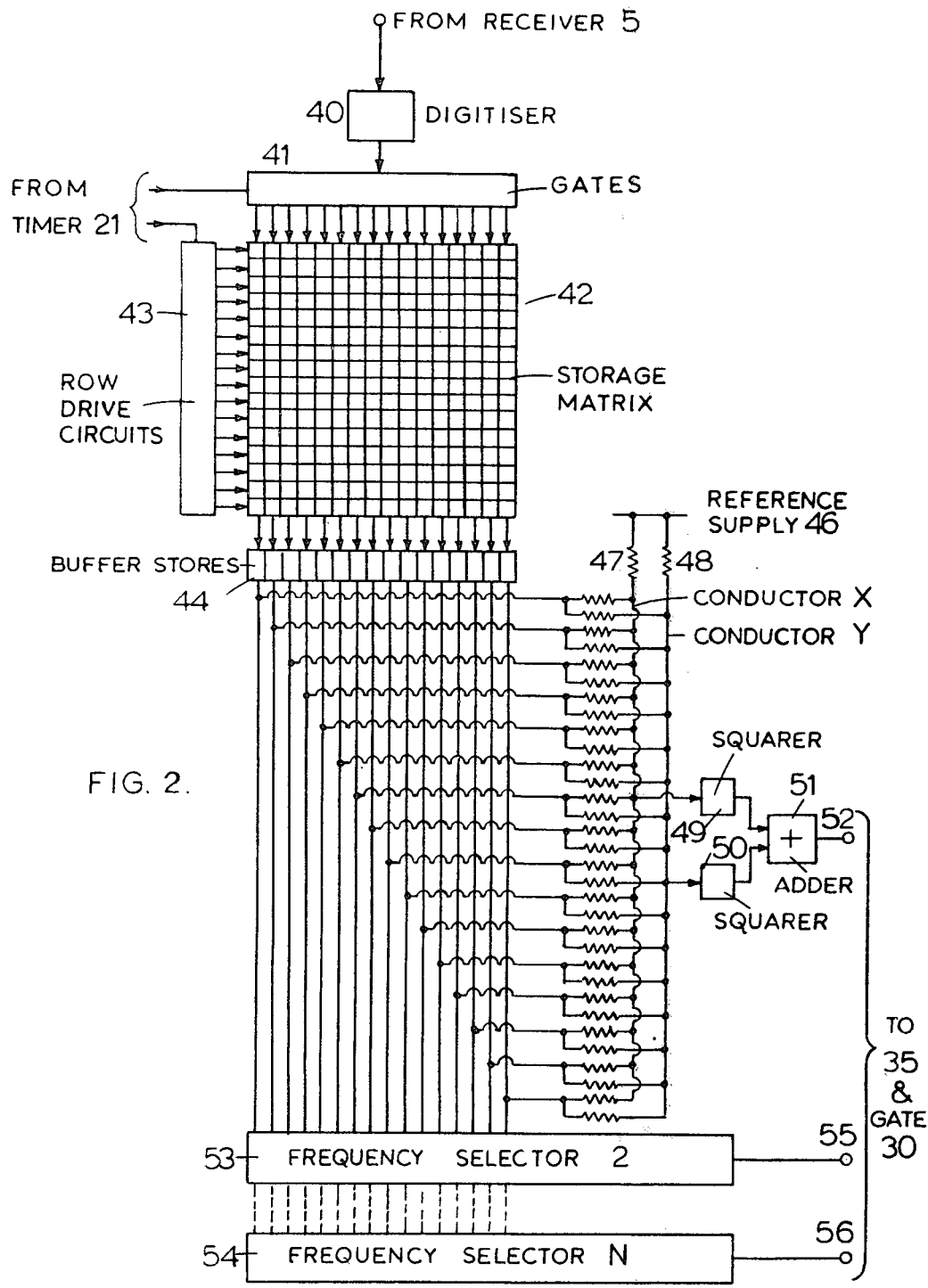
Figure 3:
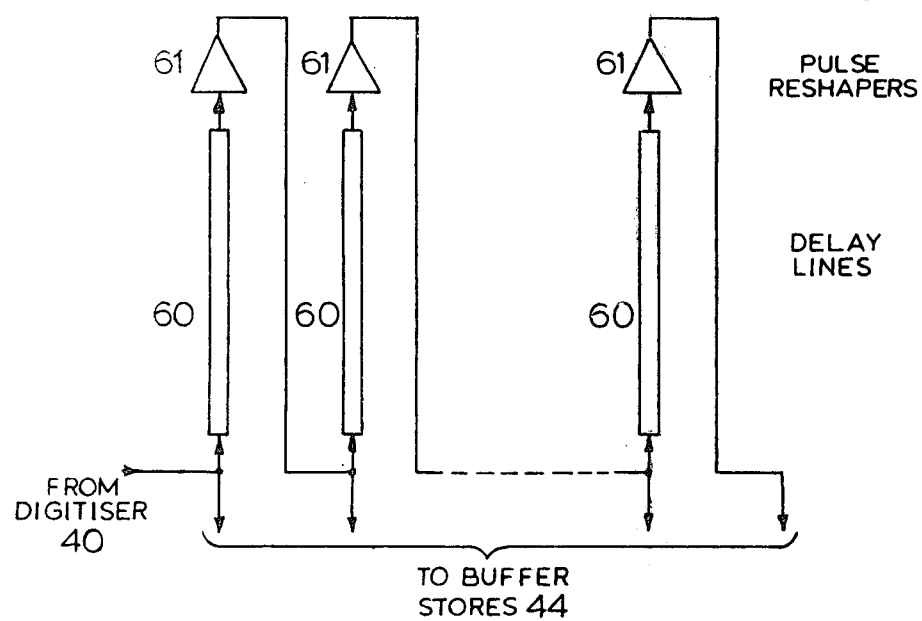

In order that the invention may be fully understood and readily carried into effect it will now be described with reference to the accompanying drawings, in which:

FIG. 1 shows in diagrammatic form one example of radar apparatus according to the invention, FIG. 2 shows in diagrammatic form a modification to FIG. 1, and FIG. 3 shows a modification to FIG. 2.

Referring to FIG. 1, pulses of r.f. energy from the transmitter 1 are produced in response to pulses from the modulator 2 and directed by the duplexer 3 to the directional aerial 4. The signals received by the aerial 4 are directed by the duplexer 3 to the coherent receiver 5. In the arrangement shown a magnetron is used in the transmitter 1 so that no continuous reference signal is available from the transmitter for the receiver 5, therefore a coherent oscillator and stable local oscillator arrangement (COHO - STALO) 6 is provided linked by the coupler 7 to the output of the transmitter 1 to produce a continuous signal of stable frequency and coherently related in phase to the transmitted pulse. Many suitable arrangements for the COHO-STALO 6 are known to those skilled in the art and it is not proposed to describe it further. If another type of transmitter is used it may be possible to dispense with the COHO-STALO 6. The output signal from the arrangement 6 is applied via the doppler cancelling circuit 8, which introduces a frequency shift in the signal fed from the arrangement 6 to the receiver 5 which cancels out the effect of the movement of the aircraft or other vessel on which the radar is mounted.

The output of the receiver 5 which includes a phase sensitive detector is applied via gate 9 or 10 to the storage tube 11 or 12. The tubes 11 and 12 are identical and are associated with identical gating arrangements so as to alternate in function. Thus while one of the tubes 11 and 12 receives the signals from the receiver 5 for storage the other is being read and prepared for a further storage operation. In the example shown, the storage tubes 11 and 12 are of a type known as the Tenicon, manufactured by the Mullard Radio Valve Company Limited and having a reference ME 1260. As shown these storage tubes are operated on a three phase cycle; in the first phase the target is charged positively by using a constant beam current with the cathode at −90V; in the second, or writing phase the cathode receives the signals from the receiver 5, the arrangement being such that the cathode is always positive by a few volts, in this way a charge pattern is set up on the target by selective discharge corresponding to the output of the receiver 5; in the third or reading phase the cathode is held at ground potential and a constant beam current is used, so as to discharge the scanned area to zero potential thereby producing signals on the target lead depending on the charge pattern remaining after the second phase. This particular cycle of operation is chosen so as to give linear writing, and since potential changes between writing and reading are only slightly bigger than the signal potentials written on the target, registration between the writing and reading positions is good. The raster used for the scan during the writing phase is a vertical one of 280 lines, and that used for the reading and recharging phases is a horizontal one of 280 lines.

If the tube 11 is receiving the output of the receiver 5, the gate 9 being open and the gate 10 closed, the gate 13 is also open connecting the write scan generator 14 to the deflection system of tube 11. During this time the tube 12 is read by connecting its cathode to ground potential, the gate 15 being open, and the gate 16 also open to transmit the signal on the target lead of the tube 12. The gate 17 is also open to apply the signal from the read/recharge scan generator 18 to the deflection system of the tube 12. After the tube 12 has been read its target is recharged by opening the gate 19 and closing the gate 15, the gate 20 also being opened and the gate 17 closed to transmit the signals from the generator 18 to the deflection system of the tube 12. The signals controlling the opening and closing of the gates and the operation of the scan generators are produced by a master timer circuit 21 which also drives the modulator 2.

When the tube 12 receives the signal from the receiver 5 gates 10 and 22 are open, the gate 22 connecting the signal from the write scan generator 23 to the deflection system of the tube 12. Two write scan generators 14 and 23 are provided to allow for some overlap in the writing operation of the tubes 11 and 12, and, in fact, a cycle time of 340 ms. is used of which 30 ms. is used for reading and 30 ms. for recharging so that 280 ms. is used for writing on each tube, allowing an overlap of 110 ms. at each side. The reading and recharging phases of the tube 11 take place when the gates 24, 25 and 26 and gates 27 and 28 are open. It will be appreciated that the gates are normally closed and are only open at the times stated.

The outputs of the tubes 11 and 12 via the gates 26 and 16 are applied to a bank 29 of 55 filters in parallel. In the drawing only a few of the filters are shown for simplicity. Each filter consists of a filter element A, a threshold circuit B and a monostable trigger C. The filters are arranged to have consecutive pass bands covering the range of frequencies related to the doppler frequencies which can occur. The outputs of the triggers of the filter bank 29 are applied to the inputs of an OR gate 30, so that if any of the triggers is set to its "1" state a signal appears at the output of the gate 30. The output of the gate 30 is applied to a display tube 31, which has scanning circuits 32 driven by the master timer 21 and by the aerial scanning motor 33 by means of scan pick-off components 34. Facilities are provided for writing on the display the velocity of the target producing a coherent doppler shift in the radar return signals. The digit selector 35 receives the outputs of the triggers C in the filter bank 29 and produces output signals indicating the corresponding velocity (i.e. corresponding to the frequency to which the one of the triggers C in the 1 state is sensitive) and numerical shape generator 36 responds to the outputs of the selector 35 to cause the electron beam of the display tube 31 to describe the appropriate characters on the screen of the tube.

In a typical application 20 ft range resolution is required, the aerial having a 1° beam width, and a 9° per second rate of scan in azimuth, which together with a 1 Kc/s pulse repetition frequency for the radar pulses, produces 55 doppler frequencies which can be resolved. As arranged the storage tubes 11 and 12 have square rastors of 280 elements each way, so that a pair of tubes can store the returns from an annulus of 280 × 20 ft = 5600 ft width, in an up and down direction of the target, each tube storing the returns from $$\frac{280 \times 9°}{1,000} \cong 2\tfrac{1}{2}°$$

of scan from left to right.

As the returns from successive radar pulses are received, they are written as a series of vertical intensity modulated lines on the target of at least one of the tubes, one line for each radar pulse. When the 280 lines have been written, the writing on that tube is stopped and it is then read rapidly (in 30 ms.) along 280 horizontal lines, each line corresponding to a 20 ft section of range. If there is a target such as a submarine snort, for example, it will be at one particular range and the intensity modulation on the storage target corresponding to successive radar returns from that range, that is to say along a horizontal line of the storage target, will have a variation of a cyclic nature depending on the velocity of the snort. When the charge pattern on the storage target is read this variation appears as a fragment of steady oscillation which is transmitted to the filters of the bank 29, passing through one of the filter elements A with a signal strength in excess of the threshold set by B and setting the corresponding monostable trigger C to the 1 state. The trigger C stays in the 1 state for about 20μ secs., sufficient to produce a bright spot on the display tube 31. After reading the storage tube is recharged ready for the next writing phase. The scan pattern during recharging is not critical so long as the whole target area is covered uniformly; it is convenient to use the same raster as for reading.

The display on the tube 31 would conveniently take the form of a B display with 180° of bearing along the horizontal axis, synchronous with aerial rotation, and range on the other axis. Other forms of display such as P.P.I. may, of course, be used but at the cost of extra complexity. The scan of the display tube could be a vertical one, with one line for each read phase of a storage tube. However more detailed bearing information would be obtained if the scan on the display tube consisted of a number of partially interleaved narrow rasters each of width corresponding to 2½° (i.e. the range of bearing values on a single storage tube) these narrow rasters being synchronous with the reading raster on the storage tube. There are 118 such narrow rasters in the full width of the display as each raster overlaps its neighbours by the extent the returns stored on the tubes 11 and 12 overlap one another. The raster is normally blacked out and receives a bright-up pulse from the gate 30 if a coherent doppler return is detected thus indicating a target. The radial relative velocity of the target as represented by the frequency of the fragment of steady oscillation produced during reading of the storage tube target may be indicated by drawing a line on the display in the direction of the target of length proportional to the velocity or by describing decimal numerals on the screen indicating the actual radial relative velocity in knots by the means shown in the drawing.

Since the aerial scans through 180° in 20 seconds and the range group for which one pair of storage tubes can handle the returns is 5600 ft it follows that the speed of the aircraft carrying the radar must not exceed 5600/20 = 280 ft per second, otherwise undesirable gaps will be left in the coverage. If desired however, further pairs of storage tubes may be used to cover other consecutive groups of ranges so that two pairs of tubes cover 11,200 ft of range between them. It may be desirable to introduce some redundancy in this respect so as to reduce the number of false alarms.

A digital display of the range, bearing and doppler frequency of any target may be produced, or a tabulated display relating to several responses. A joystick could be used to ring responses on the display tube 31 and cause the information about the target to appear in digital form, and to persist until erased.

In an alternative arrangement shown in FIG. 2 the radar returns from receiver 5 are digitised by the digitiser 40 and applied by means of gates 41 to a storage matrix 42, which may, for example, comprise magnetic cores of film elements. The writing into and reading from the matrix 42 is performed under the control of the read drive circuits 43. Both the gates 41 and the circuits 43 are actuated by signals from the master timer 21. The output signals from the matrix 42 are applied to buffer stores 44 which produce individual outputs on respective conductors which are applied in parallel to a plurality of spatial frequency selectors the first of which comprises components 45 to 51 and is shown in detail, the second being shown as the block 53 and the Nth as the block 54.

The digitiser 40 is arranged to digitise the returns from the receiver 5 into two levels only so that if the received signal is in the same phase as the local oscillator signal a 1 is produced and if it is the opposite phase a "0" is produced. The returns from a single pulse are entered in the matrix 42 in a single column, the gates 31 being controlled by a timer 21 to enter returns from successive pulses in successive columns of the matrix 42. It may, however, be preferable to provide a high speed input buffer for storing the returns from a radar pulse, the arrangement being such that after all the returns from the pulse are entered in the buffer they are transferred to the appropriate column of the storage matrix 42; in this way a matrix having a longer writing time may be employed as it is then independent of the range resolution required. The read drive circuits 43 control the entry of the returns into the matrix 42 so that the returns are entered into positions in the respective column of the matrix depending on the range of the object producing the return. Thus the matrix 42 has 280 columns and 280 rows to correspond with the example given above for one storage tube, although it is not restricted to such a small capacity and in practice, could have, say 6,000 rows corresponding to 6,000 range elements, and 330 columns for the returns from 330 successive radar pulses. The reading from the matrix 42 is carried out row by row in response to signals from the read drive circuits 43 so that at any time there is entered in the buffer stores 44 a series of successive returns corresponding to a single range element and therefore if there is a target at that range which produces a coherent Doppler shift then the output signals of the buffer stores 44 will exhibit a cyclic spatial variation at a periodicity depending on the velocity of the target.

Each of the frequency selectors is of the same construction but utilises different values of weighting resistors so as to respond to different periodicities. Considering the first frequency selector, each of the output conductors from the buffer stores 34 is connected to two resistors 45 one connected from the output conductor to a conductor X and one connected from the output conductors to a conductor Y. Conductors X and Y are also connected via biassing resistors 47 and 48 to a reference supply 46. The signals set up on the conductors X and Y are applied to respective squarers 49 and 50, the outputs of which are summed in the adder 51 to produce a signal on the output terminal 52 in the presence of the corresponding periodicity.

The weighting resistors 45 included in the frequency selectors are chosen so as to produce on the corresponding conductor X a maximum signal for a cyclic variation in the output signals of the buffer store 44 of the corresponding periodicity in one phase, and to produce on the conductors Y a maximum output in response to the presence of a cyclic variation of the same periodicity in quadrature. The resistors 47 and 48 are provided to zero the signals set up on conductors X and Y if the outputs of the buffer store 44 are not of equal magnitude and opposite polarity to indicate 0 and 1. The signals set up on the conductors X and Y are squared by squarers 49 and 50 and added in the adder 51, so that at the output terminal 52 there is produced a signal the amplitude of which indicates the amplitude of the corresponding cyclic variation in the outputs of the stores 44 but which is independent of the phase.

The output terminals 52, 55 and 56 of the frequency selectors are connected to the gate 30 and the selector 35 in FIG. 1. The arrangement of FIG. 2 replaces components 9 to 20 and 22 to 29 of FIG. 1.

Writing into the matrix 42 is carried out as the returns are received by the receiver 5. The writing operation is conveniently arranged so that data already stored is replaced by the new data. The reading of the matrix 42 is preferably non-destructive and is performed between the writing operations, about 55 rows being read in each interval between writing operations, so that within a group of 110 radar pulses all 6,000 rows of the matrix are read. It will be appreciated that 110 radar pulses impinge on any target because the p.r.f. of the radar pulses is 1 Kc/s, the rate of scanning of the aerial is 9° per second and the beam width is 1°. The provision of 330 columns in the storage matrix 42 ensures that all 110 returns from a target at any range and bearing will appear at the outputs of the buffer stores 44 simultaneously.

FIG. 3 shows an alternative arrangement to the storage matrix 42 and its associated gates 41 and read drive circuits 43. The arrangement shown in FIG. 3 comprises a plurality of delay lines 60 and pulse reshapers 61 connected in series. Each delay line 60 has a delay equal to the interval between successive radar pulses so that the input signals to all of the delay lines at any one time correspond to the same radar range. To correspond with the example described earlier there are 109 delay lines 60 providing 110 spaced signals, additional storage being unnecessary. This arrangement has the advantage that as a result of the progression of returns through the delay lines the storage of the returns provided by the delay lines is continuous and requires no separate entry phase and reading phase. The delay lines 60 may conveniently be magnetostrictive or quartz lines.

Since the returns from each radar pulse are taken for a small fraction, for example 1/20 of the interval between radar pulses, it is desirable to distribute the returns evenly along the first delay line so as to make the best use of the maximum operating frequency of the delay lines. This distribution may conveniently be achieved by providing 20 input points on the first delay line and applying the returns cyclically to these points changing the input from one point to the next with each interval corresponding to an element of the radar range. This means that the returns are not stored in range order, but modification may readily be made to the display apparatus to allow for this.

Although the invention has been described with reference to specific examples it is not limited to these examples and other arrangements using the invention will be evident to those skilled in the art. For example, the identification of the different frequency components in the output from the store may be performed by auto-correlation.

What we claim is:

1. Radar apparatus comprising means for generating a series of pulses of oscillation, scanning aerial means for transmitting said pulses as a beam narrow in azimuth in different directions sequentially, the repetition frequency of said pulses being sufficiently high in relation to the angular velocity of the aerial means and the angle of the beam that a plurality of successive transmitted pulses impinge on a point target, a coherent receiver for reflected energy, means for storing returns derived from said receiver in response to a plurality of successive pulses of oscillation from said transmitting means, means for selecting returns corresponding to a predetermined range stored in said storing means, and means for examining selected returns to detect a cyclic component of substantially constant periodicity indicating the presence of a target at said predetermined range having a radial velocity relative to the apparatus represented by said periodicity.

2. Apparatus according to claim 1 wherein said storing means comprises a storage tube, and means for distributing said returns on successive columns of the storage electrode of said tube, the returns derived in response to a single pulse being entered in a single column, said selecting means comprising means for reading a selected row of said storage electrode.

3. Apparatus according to claim 2 wherein said examining means comprises a plurality of tuned filters and individual means for each filter indicating that a significant amount of energy has passed through the respective filter, said reading means being arranged to read said selected row serially at a substantially steady rate.

4. Apparatus according to claim 2 comprising two storage tubes so arranged that writing on to and reading from the storage electrodes of the tubes is performed alternately and that reading from the storage electrode of one tube is performed during writing on to the storage electrode of one other tube.

5. Apparatus according to claim 4 wherein each said storage tube is of the single gun type.

6. Apparatus according to claim 1 wherein said storing means comprises a matrix array of discrete storage elements, means for distributing said returns along successive columns of said array, the returns derived from a single pulse being entered in a single column, said selecting means comprising means for reading a selected row of said array.

7. Apparatus according to claim 6, wherein said selecting means is arranged to read said selected row in parallel, said examining means comprising means for selectively weighting returns derived from different columns of said array and means for summing said weighted returns, the output from said summing means being a maximum for a cyclic component in said returns of a predetermined constant periodicity.

8. Apparatus according to claim 7 comprising means for producing two sums of weighted returns having maxima for cyclic components of the same periodicity in quadrature, and means for producing the sum of the squares of said two weighted sums as an output indication.

9. Apparatus according to claim 1, wherein said storing means comprises a plurality of delay lines, each of delay equal to the interval between successive pulses, connected in series, said returns being applied to a first of said series of delay lines, and said selecting means comprising means for deriving signals from the ends of said delay lines, said derived signals representing returns from the same range in response to successive pulses of oscillation.

10. Apparatus according to claim 9, wherein said examining means comprises means for selectively weighting said signals derived from the ends of said delay lines and means for summing said weighted returns, the output from said summing means being a maximum for a cyclic component in said returns of a predetermined constant periodicity.

11. Apparatus according to claim 9 comprising means for applying the returns from each pulse cyclically to a plurality of points on said first of said delay lines thereby to distribute the returns substantially evenly along said lines.

* * * * *